Aug. 18, 1970  H. F. DICKSON, JR., ET AL  3,524,234
METHOD OF FABRICATING ELECTRO-LUMINESCENT DEVICE
Filed May 22, 1968  3 Sheets-Sheet 1

INVENTORS
HERBERT F. DICKSON, JR.
IRVING D. GREENBERG &
BY ELMER O. STONE

ATTORNEY

INVENTORS
HERBERT F. DICKSON, JR.
IRVING D. GREENBERG &
ELMER O. STONE

BY

ATTORNEY

INVENTORS
HERBERT F. DICKSON, JR.
IRVING D. GREENBERG &
ELMER O. STONE
BY

ATTORNEY

United States Patent Office 3,524,234
Patented Aug. 18, 1970

3,524,234
METHOD OF FABRICATING ELECTRO-
LUMINESCENT DEVICE
Herbert F. Dickson, Jr., Seneca Falls, N.Y., Irving D.
Greenberg, Waban, Mass., and Elmer O. Stone, Seneca
Falls, N.Y., assignors to Sylvania Electric Products
Inc., a corporation of Delaware
Continuation-in-part of application Ser. No. 558,188,
May 10, 1966. This application May 22, 1968, Ser.
No. 731,043
Int. Cl. H01j 9/00
U.S. Cl. 29—25.11
14 Claims

ABSTRACT OF THE DISCLOSURE

A planar multiple character display device of the electroluminescent type includes a backing plate having a plurality of electrical conductors extending therethrough, first electrodes affixed to the backing plate and conductors, a phosphor-dielectric layer thereover, a conductive second electrode layer affixed to the phosphor-dielectric layer, an air-imperable transparent layer affixed to the second electrode layer, and a sealing layer applied to the periphery of the backing plate and transparent layer.

BACKGROUND OF THE INVENTION

This invention relates to planar multiple character display devices and a process for fabricating such devices and is a continuation-in-part of Ser. No. 558,188, filed May 10, 1966, now abandoned.

Known types of multiple character display devices, particularly electroluminescent devices, include a transparent substrate, a transparent electrically conductive layer forming a first electrode affixed thereto, a phosphor-dielectric layer overlaying the first electrode, a plurality of electrically conductive display configurations overlaying the phosphor-dielectric layer and forming multiple second electrodes, and a backplate formed to provide electrical connections to the first and second electrodes. Normally, the backplate is of an electrical insulating material having a plurality of electrical conductors discretely located and staked therein. The electrical conductors are usually in the form of metal pins passing through the insulating material and having electrically conductive rubber end portions which are aligned with and electrically connected by pressurized contact to individual ones of the first and second electrodes. Also, the periphery of the substrate and backplate are sealed with wax or epoxy to provide a unitary substantially hermetically sealed planar display device.

In the process of fabricating the above devices, one practice is to apply the transparent conductive layer or first electrode to a glass substrate, deposite a continuous phosphor-dielectric layer onto the conductive layer, and overlay the phosphor-dielectric layer with electrically conductive display configurations or multiple second electrodes. A separate backing plate is formed by staking metal pins into an insulating board at discrete locations with an electrically conductive rubber end portion affixed to each of the conductors.

Thereafter, the substrate having the first electrode, phosphor-dielectric layer and multiple second electrodes thereon and the backing plate are aligned and forced together by pressure exerted thereon. In this manner, the rubber end portion of an electrical conductor is electrically connected to each of the second electrodes and the rubber end portion of certain selected conductors contacts the first electrode. Moreover, the peripheral surface of the substrate and the backing plate are hermetically sealed to provide a unitary structure.

While planar multiple character display devices of the electroluminescent type and the above fabrication process have notably advanced the art, it has been found that such devices and processes leave much to be desired in commercial production as well as in numerous applications of such devices. For example, it has been found that one of the more serious deficiencies of such structures and processes is the difficulty, if not impossibility, of achieving and maintaining alignment and electrical contact between the electrical conductive rubber end portions of the conductors and the electrodes affixed to the substrate. Such undesirable factors as warping of the backplate, warping of the substrate, and differences in linear expansion between the backplate and the substrate are all deleterious to the achievement and maintenance of the desired electrical contact between the conductors and the electrodes. Moreover, such alignment and electrical contact problems are magnified as the size and width of the display configurations are reduced and the complexity of the configurations increased.

Also, differences in linear expansion coefficients between the backing plate and the substrate cause difficulties in attempts to maintain a hermetic peripheral seal while the hermeticity of staked electrical conductors leaves much to be desired. Moreover, the cost and electrical contact reliability of the electrically conductive rubber end portions of the conductors as well as the space requirements thereof, are areas where improvment requirements are readily recognized.

OBJECTS AND SUMMARY OF THE INVENTION

Therefore, it is an object of this invention to provide an enhanced planar multiple character display device of the electroluminescent type.

Another object of the invention is to provide an improved process for fabricating planar multiple character display devices of the electroluminescent type.

Still another object of the invention is to provide an improved planar multiple character display device and fabrication process by enchancing the fabrication of a backplate suitable for use in such devices.

A further object of the invention is to provide an improved electroluminescent device of the planar multiple character display type and an enhanced process for fabricating such devices.

These and other objects are achieved in one aspect of the invention by a process wherein a backing plate is disposed within a mold, an apertured jig is disposed thereon, a plurality of electrical conductors are inserted within the apertures of the jig, a force is exerted on the conductors, heat is applied to cause the condutcors to pass through the backing plate, the backing plate is then cooled to cause hermetic sealing of the conductors and the backing plate, and subsequently one surface of the backing plate is ground to expose the ends of the conductors flush with the planar surface of the backing plate.

In another aspect of the invention, a planar multiple character display device of the electroluminescent type is fabricated by a process wherein a plurality of electrically conductive display configurations or first electrodes are deposited onto the above described backing plate, a phosphor-dielectric layer is deposited thereover, a continuous transparent electrically conductive layer or second electrode is deposited onto the phosphor-dielectric layer, an air-impermeable transparent layer is affixed to the phosphor-dielectric layer and a hermetic sealing layer is applied to the periphery of the backing plate and the transparent layer to provide a unitary hermetically sealed planar multiple character electroluminescent display device.

DESCRIPTION OF THE PREFERRED EMBODIMENT

For a better understanding of the present invention, together with other and further objects, advantages and capabilities thereof, reference is made to the following disclosure and appended claims in connection with the accompanying drawings in which:

Figure 1:
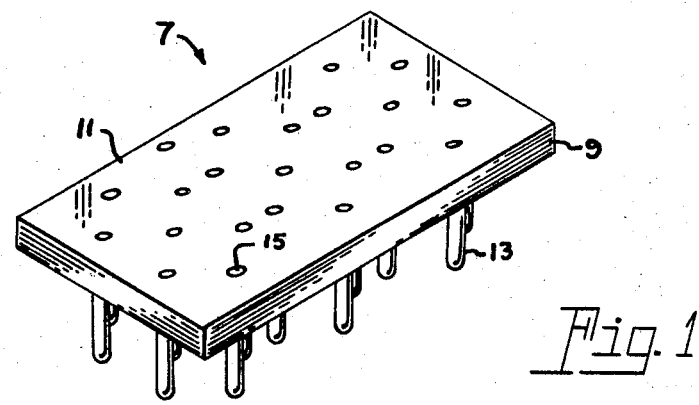
FIG. 1 is a perspective view of an article fabricated in accordance with one aspect of the invention.

Referring to the drawings, FIG. 1 is illustrative of a backing plate 7 preferably in the form of a glass plate 9 having a substantially smooth surface 11, although electrical insulating plate material such as ceramic and plastic are also applicable and appropriate. A plurality of discretely located electrical conductors 13 in the form of metal pins pass through and are hermetically sealed to the glass plate 9. Also, each of the conductors 13 has a substantially flat end portion 15 and all of the end portions 15 are substantially flush with the smooth surface 11 of the glass plate 9.

Figure 2:
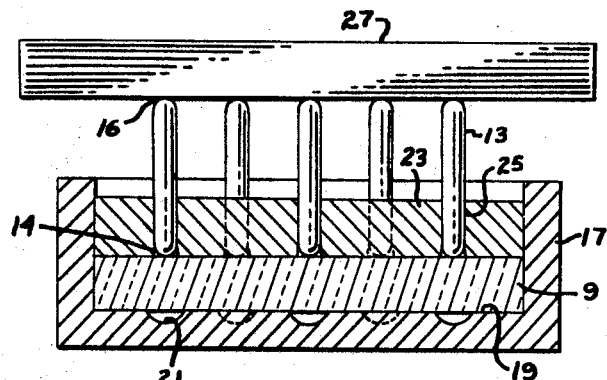
FIG. 2 is a sectional elevational view of one step in a process for manufacturing the article of FIG. 1.

As to a process for fabricating the backing plate 7, FIG. 2 illustrates a substantially U-shaped mold 17 of a material such as graphite which was selected because of the tendency thereof to resist adherence to glass surfaces. Also, a graphite was chosen having coefficient of linear expansion somewhat similar to the linear expansion coefficient of the glass utilized.

The U-shaped mold 17 has an inner bottom surface 19 wherein is located a plurality of rounded indentations 21 and the glass plate 9 is deposited onto and supported by the bottom surface 19 bridging the indentations 21. A jig 23 of graphite material is disposed on and supported by the glass plate 9. The jig 23 has a plurality of discretely located apertures 25 which are formed to align with the indentations 21.

An electrical conductor 13 in the form of a metal pin is inserted into each of the apertures 25.

A rounded end portion 14 of each of the conductors 13 contacts the glass plate 9 which serves to support the conductors 13 within the apertures 25 of the jig 23. A force in the form of a weight 27 is applied to the opposite rounded end 16 of each of the conductors 13.

Figure 3:
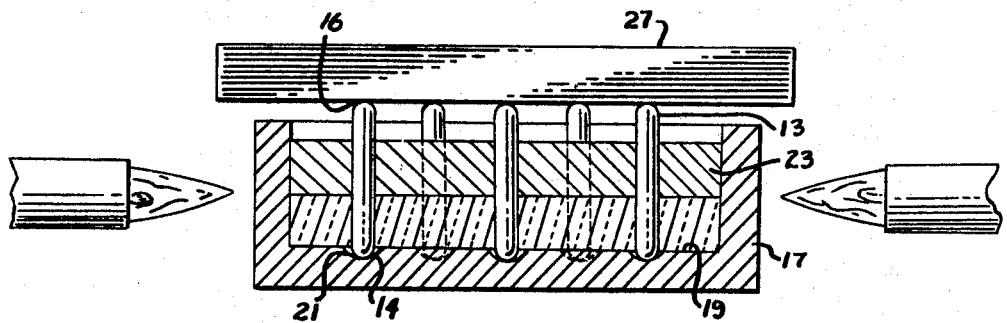
FIG. 3 is a sectional elevational view of a further step in a process for manufacturing the article of FIG. 1.

Thereafter, heat is applied in an amount sufficient to cause the glass plate 9 to reach the working temperature thereof whereupon the force applied by the weight 27 causes the conductors 13 to penetrate the glass plate 9 and enter the indentations 21 of the mold 17 substantially as illustrated in FIG. 3. Preferably, the heat is applied in a furnace having a neutral or slightly reducing atmosphere in order to prevent deterioration of the mold 17 and of the jig 23.

As a specific example, a glass plate 9 of ordinary window glass or soda lime glass having a coefficient of expansion of about $93 \times 10^{-7}$ units/cc. was placed in a graphite mold having a coefficient of expansion of about $80 \times 10^{-7}$ units/cc. and heated for about 5 minutes to a temperature in the range of about 900 to 950° C. Thereupon, the electrical conductors 13 penetrated the glass plate 9 and upon cooling were hermetically sealed therein.

Figure 4:
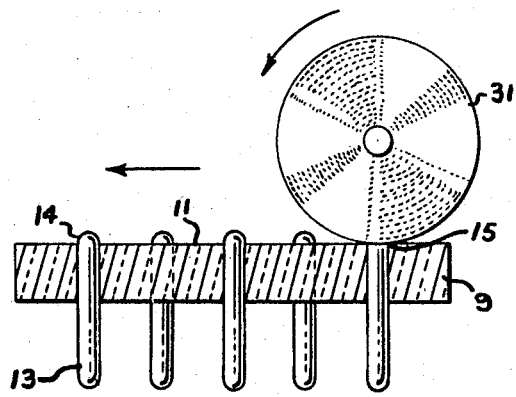
FIG. 4 is an illustration of a further step in a process for manufacturing the article of FIG. 1.

After the glass plate 9 has been cooled and annealed in a manner well known in the art of working glass, the glass plate 9 with the conductors 13 hermetically sealed therein is removed from the source of heat. Thereupon, the surface of the glass plate 9 as well as the rounded end portion 14 of the conductors 13 are ground by ordinary means such as a grinding wheel 31, illustrated in FIG. 4, to provide a smooth surface 11 on the glass plate 9 with the flattened end portions of the pins 15 flush therewith.

Figure 5:
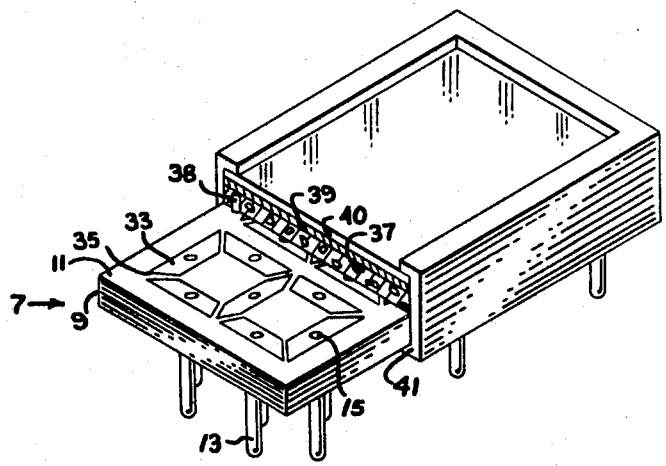
FIG. 5 is a perspective view, partially in section, of another embodiment of the invention.

Referring now to an enhanced planar multiple character electroluminescent display device, FIG. 5 illustrates one embodiment of such a device including a glass backing plate 7 having a smooth surface 11 with exposed end portions 15 of the hermetically sealed electrical conductors 13 flush therewith. Individual electrical conductors or first electrodes 33 in the form of a display configuration are disposed on the smooth surface 11. Each of the first electrodes 33 is electrically isolated from the others by spacings 35 therebetween. Also, each of the first electrodes 33 is electrically connected to the end portion 15 of at least one of the electrical conductors 13.

Overlaying the first electrodes 33 and the remainder of the smooth surface 11 is a phosphor-dielectric layer 37. An electrically conductive layer or second electrode 39 is affixed to the phosphor-dielectric layer 37 and an air impermeable transparent layer 40 is disposed on the second electrode 39. Also, a hermetic seal 41 is affixed to the periphery of the glass backing plate 7 and the transparent layer 40 to provide a unitary hermetically sealed planar multiple character electroluminescent display device.

Figure 6:
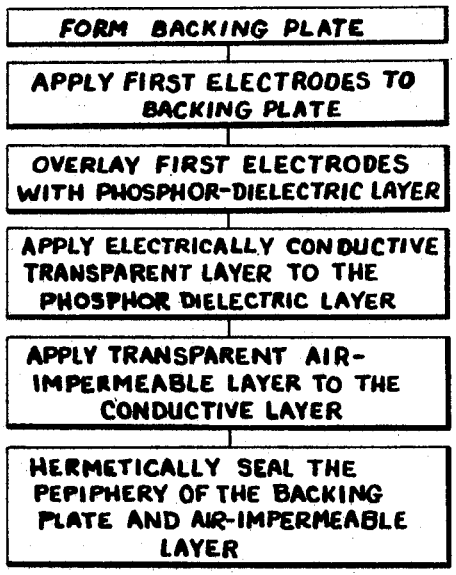
FIG. 6 is a diagram, in block form, illustrating a process for fabricating the embodiment of FIG. 5.

Referring to the block diagram of FIG. 6, an improved process for fabricating the enhanced planar multiple character electroluminescent display device illustrated in FIG. 5 includes the steps of forming a planar backing plate, depositing a plurality of individual electrical conductors on one surface thereof, overlaying the conductors with a phosphor-dielectric layer, depositing an electrically conductive layer or second electrode onto the phosphor-dielectric layer, overlaying the second electrode with an air-impermeable transparent layer, vacuum heating the backing plate, electrical conductors, phosphor-dielectric layer, and electrically conductive layer to remove the moisture therefrom, and hermetically sealing the periphery of the backing plate and layers.

More specifically, one particular embodiment includes a backing plate 7 having a planar smooth surface 11 and a multiplicity of electrical conductors 13 hermetically sealed therein. This backing plate 7 is preferably fabricated in accordance with the previously described process wherein each of the electrical conductors 13 has an exposed end 15 which is substantially flush with the smooth surface 11 of the glass backing plate 7.

The individual conductive first electrodes 33, isolated from each other by spacings 35, are deposited onto the smooth surface 11 of the glass backing plate 7 by silk screening, vacuum depositions or any one of a number of similar well known techniques to form a display configuration. Each of the electrodes 33 is electrically connected to the end portion 15 of at least one of the electrical conductors 13 whereby energization thereof is provided. Also, the electrodes 33 are of an electrically conductive material such as aluminum, silver, and gold which are especially adapted to both the deposition techniques and electrical conduction capabilities desired.

A phosphor-dielectric layer 37 is deposited onto and overlays the first electrodes 33 as well as the remainder of the smooth surface 11 of the glass backing plate 7. The phosphor-dielectric layer 37 may be deposited by spraying, painting, in the form of a film, or any one of a number of well known deposition techniques. Also, the phosphor-dielectric layer 37 includes any electroluminescent phosphor material energizable by an electric field to produce visible light and any one of a number of suitable dielectric materials such as polyvinyl-chloride acetate, methyl methacrylate, polystyrene, and glass frit.

Further, it should be noted that the phosphor-dielectric layer 37 may be applied as a singular layer or as individual lamina of phosphor materials and dielectric materials depending upon the type of device desired. For example, a preferred so-called "plastic" type of device would include a first lamina of dielectric material such as barium titanate suspended in a suitable binder and affixed to the first electrodes 33 and smooth surface 11 and a second lamina of phosphor materials such as copper doped zinc sulphide in a suitable binder such as cyano ethyl cellulose and affixed to the first lamina.

Alternatively, the device may be of the so-called "ceramic" type, in which case the phosphor-dielectric layer 37 would be a singular layer including a mixture of dielectric material, such as glass frit for example, and the above-mentioned phosphor materials. Moreover, the phosphor-dielectric layer 37 for the "ceramic" type of structure would be fired at a temperature in the range of about 1000 to 1100° F. to cause fusion of the above-mentioned glass frit material.

Further, the end portion 15 of certain selected ones of the electrical conductors 13 is masked or shielded prior to the application of the phosphor dielectric layer 37. Thus, removal of the mask or shielding after the phosphor-dielectric layer 37 has been applied causes exposure of the end portion 15 of the certain selected ones of the electrical conductors 13. Obviously, the phosphor-dielectric layer 37 may be applied in a continuous uninterrupted layer and a portion 38 thereof removed to cause exposure of the end portion 15 of certain selected ones of the electrical conductors 13.

A continuous uninterrupted light transparent electrically conductive layer 39 forming a second electrode is affixed to and overlays the phosphor-dielectric layer 37. This conductive layer 39 forming the second electrode extends through the removed portion 38 of the phosphor-dielectric layer 37 and contacts and is electrically connected to the exposed end portion 15 of the certain selected ones of the electrical conductors 13. In this manner, energization of both the first and second electrodes, 33 and 39 respectively, is made possible by way of the electrical conductors 13.

The transparent electrically conductive layer 39 or second electrode may be of a material such as tin oxide, bismuth oxide, and aluminum oxide. Preferably, the conductive layer 39 is of a material such as indium oxide suspended in a binder of vinylidene fluoride. This indium oxide suspension is preferred because of the ease with which the conductive layer 39 may be applied whereby the necessity of utilizing heat during the application process is eliminated.

At this stage, the planar electroluminescent planar display device is virtually completed except for protecting the device from physical damage and humidity. Moreover, numerous humidity and physical protective techniques such as potting, dip-coating, and spraying are applicable and appropriate to the above-described device.

More specifically, a transparent air-impermeable layer 40 is disposed upon the transparent electrically conductive layer 39. The transparent air-impermeable layer 40 serves as a protective covering for the conductive layer 39 and may be any one of a number of well known and appropriate plastic materials. Preferably, the air-impermeable layer 40 is in the form of a transparent glass plate which is especially well adapted to metallizing and pigment impregnation to provide a controllable amount of light transmissibility and contrast between an activated and inactivated condition of the electrodes 33. Thereafter, the structure including the planar backing plate 7, the individual electrical conductors 33, the phosphor-dielectric layer 37, the electrically conductive layer 39, and the transparent air-impermeable layer 40 is vacuum heated to cause the removal of moisture therefrom. For example, one particular embodiment was heated for approximately 30 minutes at a temperature of about 120° C. and a pressure of about $2 \times 10^{-5}$ millimicrons.

Having removed the moisture, the periphery of the backing plate 7 and the air-impermeable layer 40 is hermetically sealed 41 with a suitable material such as wax, epoxy, and solder. Also, numerous variations to the hermetic seal 41 will occur to those skilled in the art. For instance, the periphery of the backing plate 7 and air-impermeable layer 40 may be metallized to facilitate a soldering process. Further, the hermeticity of an epoxy seal may be enhanced by an additional covering of a material such as rubber.

Additionally, a portion of the periphery of the backing plate 7 and air-impermeable layer 40 may be sealed prior to the vacuum heating, the structure vacuum heated, a back fill of an inert material such as nitrogen introduced into the structure, and the seal affixed to the periphery of the backing plate 7 and air-impermeable layer 40 completed. Moreover, numerous well known exhaust and back fill techniques such as glass tubulations are appropriate and applicable to the process. Also, the use of metal and plastic frames to encase the hermetic seal 41 whereby the appearance is enhanced and the device made more rugged may be included within the confines of the previously-described fabrication process.

Thus, there has been provided a unique hermetically sealed planar multiple character electroluminescent display device and an improved process for the fabrication thereof. Further, there has been provided a unique process for fabricating backing plates suitable for use in the above-mentioned display devices. Moreover, the above-mentioned display device and processes are not only unique and previously unknown but also provide numerous advantages unattainable in any known device or process.

As an example, the electrical conductors in the form of metal pins are readily available in large quantities, inexpensive as compared with conductors having electrically conductive rubber affixed thereto, and have an improved hermeticity when sealed into a glass plate. The all-glass backing plate will be flat due to the grinding thereof assuring an easily assembled unit and has an expansion characteristic perfectly matching a transparent glass protective covering assuring improved reliability of the hermetic seals even during such tests as thermal cycling.

Further, the entire display device and fabrication process lends itself much more readily to mass production techniques greatly reducing the operational steps and complexities of manufacture. The fabrication technique and structure has virtually eliminated "loss of contact" and registration problems and permits re-working of subassemblies early in the production cycle, thereby greatly reducing costs. The elimination of the pressure-sealing type of structure reduces the volume of entrapped air in the system providing an enhanced structure especially adapted to adverse environments. Also, the improved structure and fabrication process permit the use of patterns of increased density and complexity as well as reduced size and width.

While there has been shown and described what is at present considered the preferred embodiments of the invention, it will be obvious to those skilled in the art that various changes and modifications may be made therein without departing from the scope of the invention as defined by the appended claims.

What is claimed is:

1. In a process for fabricating a planar multiple character electroluminescent display device, the steps comprising:

forming a planar glass backplate having a multiplicity of electrical conductors hermetically sealed therein and extending therethrough, each of said conductors having a discrete location and an exposed end portion substantially flush with one surface of the glass backplate;

depositing a plurality of individual electrically conductive first electrodes in the form of a display configuration onto said one surface of said backplate, each of said first electrodes being separately energizable and electrically connected to at least one of said conductors;

overlaying said first electrodes with a phosphor-dielectric layer, said layer having apertures therein aligned with the end portion of selected ones of said electrical conductors;

applying a transparent electrically conductive layer forming a second electrode onto said phosphor-dielectric layer, said conductive layer extending through said apertures in said phosphor-dielectric layer and electrically contacting the end portion of said selected ones of said electrical conductors;

applying a transparent air-impermeable layer onto said electrically conductive layer;

vacuum heating said backing plate, conductive first electrodes, phosphor-dielectric layer, conductive layer, and air-impermeable layer to remove the moisture therefrom; and forming a hermetic seal jointure between the periphery of said backing plate and said air-impermeable layer to provide a unitary hermtrically sealed electroluminescent multiple display device.

2. The process of claim 1 wherein said phosphor-dielectric layer includes a first lamina of dielectric materials overlayed with a second lamina of phosphor materials.

3. The process of claim 1 wherein the transparent air-impermeable layer is in the form of a glass plate.

4. The process of claim 1 wherein an inert gas back fill is introduced intermediate said back plate and said air-impermeable layer after vacuum heating and prior to hermetic sealing.

5. The process of claim 3 wherein a metallized layer is applied to said air-impermeable layer to provide a controlled light transmissibility.

6. In a process for fabricating a planar multiple character electroluminescent display device, the steps comprising:

hermetically sealing a multiplicity of discretely located electrical conductors in a glass backing plate, said backing plate having a smooth surface and each of said conductors having an exposed end portion substantially flush with said smooth surface;

applying a plurality of individually energizable electrically conductive first electrodes onto said smooth surface of said backing plate, each of said first electrodes being electrically connected to the exposed end portion of at least one of said electrical conductors;

applying a phosphor-dielectric layer onto said first electrodes and said smooth surface of said backing plate, said layer having apertures aligned with the exposed end portion of certain selected ones of said electrical conductors;

overlaying said phosphor-dielectric layer with a transparent electrically conductive layer forming a second electrode, said conductive layer extending through through said apertures in said phosphor dielectric layer and electrically contacting said exposed end portion of said certain selected ones of said electrical conductors;

applying a transparent air-impermeable layer onto said electrically conductive layer; and applying a hermetic seal intermediate the periphery of said backing plate and said air-impermeable transparent layer to provide a unitary hermetically sealed electroluminescent display device.

7. The process of claim 6 wherein said electrical conductors are in the form of metal pins and said phosphor-dielectric layer includes a first lamina of barium titanate dielectric material overlayed with a second lamina of copper doped zinc sulphide phosphor materials.

8. The process of claim 6 wherein said phosphor-dielectric layer includes a singular layer having therein a mixture of glass frit dielectric material and copper doped zinc sulphide phosphor material, said layer being fired at a temperature sufficient to fuze said dielectric material.

9. The process of claim 7 wherein said transparent electrically conductive layer forming a second electrode includes indium oxide.

10. In a process for fabricating a planar multiple character electroluminescent display device, the steps comprising:

hermetically sealing a multiplicity of discretely located electrical conductors in a backing plate of electrical insulating material, said backing plate having a smooth surface and each of said conductors having an exposed end portion substantially flush with said smooth surface;

applying a plurality of individually energizable electrically conductive first electrodes onto said smooth surface of said backing plate, each of said first electrodes being electrically connected to the exposed end portion of at least one of said electrical conductors;

applying a phosphor-dielectric layer onto said first electrodes and said smooth surface of said backing plate, said layer having apertures aligned with the exposed end portion of certain selected ones of said electrical conductors;

overlaying said phosphor-dielectric layer with a transparent electrically conductive layer forming a second electrode, said conductive layer extending through said apertures in said phosphor dielectric layer and electrically contacting said exposed end portion of said certain selected ones of said electrical conductors;

applying a transparent air-impermeable layer onto said electrically conductive layer; and applying a hermetic seal intermediate the periphery of said backing and said air-impermeable transparent layer to provide a unitary hermetically sealed electroluminescent display device.

11. The process of claim 10 wherein said phosphor-dielectric layer includes a first lamina of dielectric materials overlayed with a second lamina of phosphor materials.

12. The process of claim 10 wherein the transparent air-impermeable layer is in the form of a glass plate.

13. The process of claim 10 wherein an inert gas back fill is introduced intermediate said back plate and said air-impermeable layer after vacuum heating and prior to hermetic sealing.

14. The process of claim 10 wherein a metallized layer is applied to said air-impermeable layer to provide a controlled light transmissibility.

References Cited

UNITED STATES PATENTS

| | | |
|---|---|---|
| 3,266,022 | 7/1966 | Caracciolo. |
| 3,317,983 | 5/1967 | Dewit et al. |
| 3,321,657 | 5/1967 | Granitsas et al. |

JOHN F. CAMPBELL, Primary Examiner

W. I. BROOKS, Assistant Examiner

U.S. Cl. X.R.

29—569, 625

PO-1050
(5/69)

UNITED STATES PATENT OFFICE
CERTIFICATE OF CORRECTION

Patent No. 3,524,234          Dated August 18, 1970

Inventor(s) Herbert F. Dickson, Jr., Irving D. Greenberg, and Elmer O. Stone

It is certified that error appears in the above-identified patent and that said Letters Patent are hereby corrected as shown below:

Column 1, line 22 of the specification "imperable" should read --impermeable--.

Column 1, line 56 "deposite" should read --deposit--.

Column 7, Claim 1, line 19 "sealed electroluminescent" should read --sealed planar electroluminescent--.

Column 7, Claim 6, line 56 delete second "through".

Column 8, Claim 10, line 41 "backing and" should read -- backing plate and--.

SIGNED AND
SEALED
NOV 17 1970

NOV. 17, 1970

(SEAL)
Attest:

Edward M. Fletcher, Jr.
Attesting Officer

WILLIAM E. SCHUYLER, JR.
Commissioner of Patents